US005950790A

United States Patent [19]

Barber

[11] Patent Number: 5,950,790

[45] Date of Patent: Sep. 14, 1999

[54] LINEAR STOPPING AND POSITIONING APPARATUS

[76] Inventor: Steven C. Barber, 24395 Wood Dr., Shorewood, Minn. 55331

[21] Appl. No.: 08/967,461

[22] Filed: Nov. 11, 1997

[51] Int. Cl.[6] .......................... F16D 11/04; F01B 29/00; G05G 1/04

[52] U.S. Cl. ............................... 192/139; 74/526; 92/88

[58] Field of Search .................................. 192/138, 139; 74/817, 526; 92/88, 18, 20, 28

[56] References Cited

U.S. PATENT DOCUMENTS

| | | | |
|---|---|---|---|
| 512,313 | 1/1894 | McDonald . | |
| 1,038,636 | 9/1912 | Oxnard . | |
| 1,447,242 | 3/1923 | Fritz . | |
| 1,809,615 | 6/1931 | Wilson . | |
| 1,845,797 | 2/1932 | Kearney . | |
| 2,038,595 | 4/1936 | Noble . | |
| 2,627,846 | 2/1953 | Boedeker . | |
| 2,692,693 | 10/1954 | Newburg . | |
| 2,828,722 | 4/1958 | Bohnhoff et al. . | |
| 2,893,353 | 7/1959 | Short, Jr. et al. . | |
| 3,010,587 | 11/1961 | Hollinger . | |
| 3,094,883 | 6/1963 | Junge et al. | 74/526 |
| 3,477,229 | 11/1969 | Katko . | |
| 3,568,559 | 3/1971 | Fink . | |
| 3,592,131 | 7/1971 | Harvey et al. . | |
| 3,822,635 | 7/1974 | Nishimura . | |
| 3,941,141 | 3/1976 | Robert . | |
| 4,020,745 | 5/1977 | Iijima et al. . | |
| 4,351,628 | 9/1982 | Drexel et al. . | |
| 4,409,888 | 10/1983 | Weyer . | |
| 4,829,880 | 5/1989 | Lieberman . | |
| 4,898,080 | 2/1990 | Lieberman . | |
| 5,177,739 | 1/1993 | Maher et al. . | |
| 5,190,263 | 3/1993 | Roberts . | |
| 5,297,470 | 3/1994 | NIederstadt et al. . | |
| 5,297,812 | 3/1994 | Maki et al. | 92/88 X |
| 5,570,769 | 11/1996 | Eicher et al. . | |

*Primary Examiner*—Charles A. Marmor
*Assistant Examiner*—Roger Pang
*Attorney, Agent, or Firm*—James V. Harmon

[57] ABSTRACT

A linear pneumatic actuator stopping and positioning apparatus has a pneumatic actuator connected to a worktable for moving the worktable along a rectilinear path as well as a selector shaft that is mounted for rotational indexing movement at one side of the actuator and is operatively associated with one or more extendible stop arms for selecting a stop arm located at a selected stop point so as to contact the worktable and stop the movement of the worktable at the stop point selected. The shaft can be mounted to allow it to be shifted along its own central axis for moving one or more sleeve members that are connected to the shaft a short distance for extending a stop arm to an operating position. In one form, a stop arm actuator and locking bar is positioned to be engaged by the sleeve and to press the stop arm to its extended position. In another form of the invention, a stop plate is mounted on the selector shaft for rotation with the shaft as the shaft is indexed one or more times through a predetermined arc for extending a lobe on the plate to an operating position in the path of the worktable to halt the worktable at a selected stop point. In a third form, the stop member is screw-threaded into a hub that is mounted on the selector shaft and can be threaded into or out of the hub for establishing a selected stop point.

28 Claims, 11 Drawing Sheets

LINEAR STOPPING AND POSITIONING APPARATUS

FIELD OF THE INVENTION

This invention relates to a linear stopping and positioning apparatus. The invention is especially suited for stopping and locating the carriage of a pneumatic actuator at one or more selected positions.

BACKGROUND OF THE INVENTION

In the field of robotics and factory automation, high-speed, accurate multiple positioning of a workpiece is a common requirement. Hydraulics have been previously used but hydraulic systems are expensive and any leakage of hydraulic fluids produces a contamination problem which can not be tolerated in many applications including food packaging, biomedical assembly, electronics manufacturing or environments requiring clean-room conditions. In comparison to hydraulic systems, pneumatic systems are very cost-effective, are easily understood and maintained, and can be operated by a broad range of personnel. However, because air is compressible, pneumatic actuators alone are incapable of accurately positioning a workpiece in any more than the terminal positions, ie. their fully-extended and fully-retracted positions, at the end of each stroke. Currently there is a high demand for systems that are capable of accurately and repeatably positioning a workpiece at multiple locations. Typically, stepper motors or servo motors are combined with a ball-screw and linear actuator to produce such a positioning system. While these systems are quite accurate and produce repeatable results, they are very expensive and require a highly-skilled operator to integrate, setup, debug and run them. It is a general objective of this invention to provide a simpler, less costly but highly accurate positioning system.

A cost-effective, accurate and repeatable mid-stroke stopping and positioning method using pneumatics has not been successfully achieved by the prior art. Attempts have been made in the past, for example in U.S. Pat. Nos. 4,829,880 and 4,898,080, to locate a workpiece at any of several pre-set stop points but these attempts have not been successful. In the patented device a magnet is used to position a pivoted latching arm but this system has inherent weaknesses that have made it commercially unacceptable. First, pneumatic actuators have the ability to produce several hundred pounds of force. Therefore, the stopping mechanism must be robust enough to withstand these forces and still maintain accuracy and repeatability. In addition, once the worktable reaches a pre-set stop point, the pivoted latching arm used in the patented device becomes locked in place by the worktable. Therefore, the worktable must be backed off (moved in the reverse direction) to clear the latch, in order to allow forward motion to continue. Moreover, commercial products made under these patents did not have sufficient positioning accuracy or repeatability to meet the demanding requirements of the automation industry. In addition, there was no positive mechanical member holding the latch arm in an extended position.

In view of these and other shortcomings of the prior art, it is one object of the invention to provide a positive linear pneumatic positioning system capable of locating a worktable in one or any of a plurality of linearly arranged stop positions with an accuracy up to 0.001 inch to assure precision placement and assembly of parts held on the worktable.

Another object is to enable the workpiece to continue motion in a given direction after stopping without having to first back off in the reverse direction.

Still another object is to find a way of moving both the worktable and the stop arm using standard parts, namely, pneumatic actuators each consisting of a cylinder and a piston assembly that is commercially available.

A further object is to provide a positive linear positioning and stopping system that has the capability of advancing to the next pre-set position in a sequential manner or to advance to any of a plurality of pre-set positions in a random manner.

Another object is to provide both unidirectional as well as bi-directional positioning capabilities.

In addition, an object of the invention is to be easily adaptable to any of the various linear pneumatic actuator configurations that are commercially available today.

A further, more specific object is to provide a positive linear pneumatic positioning system that uses a first pneumatic cylinder and piston assembly for moving a worktable and a second pneumatic indexing cylinder and piston assembly for selecting a stop member that is to be placed in an operating position.

Another object is to provide a positive mechanical element for locking a selected stop member in an extended operating position.

These and other more detailed and specific objects of the present invention will be better understood by reference to the following figures and detailed description which illustrate by way of example but a few of the various forms of the invention within the scope of the appended claims.

SUMMARY OF THE INVENTION

This invention provides a positive linear stopping and positioning apparatus that employs an actuator including a cylinder and a movable piston for moving a worktable along a rectilinear path. One aspect of the invention is the provision of a second actuator comprising a cylinder and piston combination for moving a selected one of a plurality of stop members to an operating or stopping position adapted to engage the worktable and hold it at a predetermined precisely positioned stop point.

Another aspect of the invention is the provision of a locking mechanism for positively and mechanically locking a selected stop arm in an operating position adapted to stop the worktable at a selected stop point.

Still another aspect of the invention is the provision of a single movable member that serves both as a stop arm actuator or extender and a stop arm locking member for positively and mechanically locking a selected stop arm in an operating position.

Yet another feature of the invention is a means for indexing a movable member one or more times to select a particular one of several stop points where the worktable is intended to stop.

A further aspect of the invention is the provision of a positioning system for a pneumatic actuator that includes a plurality of linearly distributed stop assemblies with a movable indexing shaft that extends between all of the stop assemblies and is operatively associated with each of the stop assemblies for sequentially or randomly placing a stop arm located at each of the stop assemblies in an operating position and for halting the movement of the indexing shaft when a selected stop arm is in an operating position.

Yet another, more specific, feature of the invention is the provision of an indexing shaft that rotates for selecting a stop point and is moved in a different way to extend a selected stop arm to an operating position.

The invention also provides a positive linear positioning and stopping system that can be retrofitted for use with a commercially available pneumatic actuator cylinder containing a movable piston for moving a worktable or workpiece along a rectilinear path. The invention is well adapted to include or to be used with several pneumatic actuator types including, but not limited to, band cylinders, magnetically coupled cylinders, slide-type cylinders, and rod-type cylinders.

The invention is also useful for locating other kinds of moving machine elements in addition to pneumatic actuators, e.g. for locating a movable machine element in any of a plurality of selected positions. In this application the invention can be used as a back gauge for a press brake or shear or for locating the cutting head of a milling machine, drill press, cut-off saw or similar machine that employs an operating head that requires positioning in any of several selected positions or in which the position, e.g., the height, of a machine operating table is to be positioned in one or a plurality of selected stop points. Each of the selected stop points can be pre-set manually in any of an infinitely variable number of positions.

THE FIGURES

FIGS. 5A–D are horizontal cross-sectional views of one of the stop assemblies showing the progressive extension of the stop arm.

Figure 6:
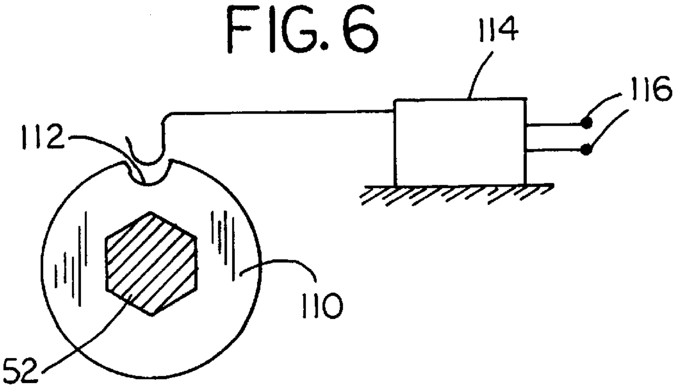

FIG. 6 is a diagrammatic vertical sectional view showing the homing switch assembly.

Figure 7:
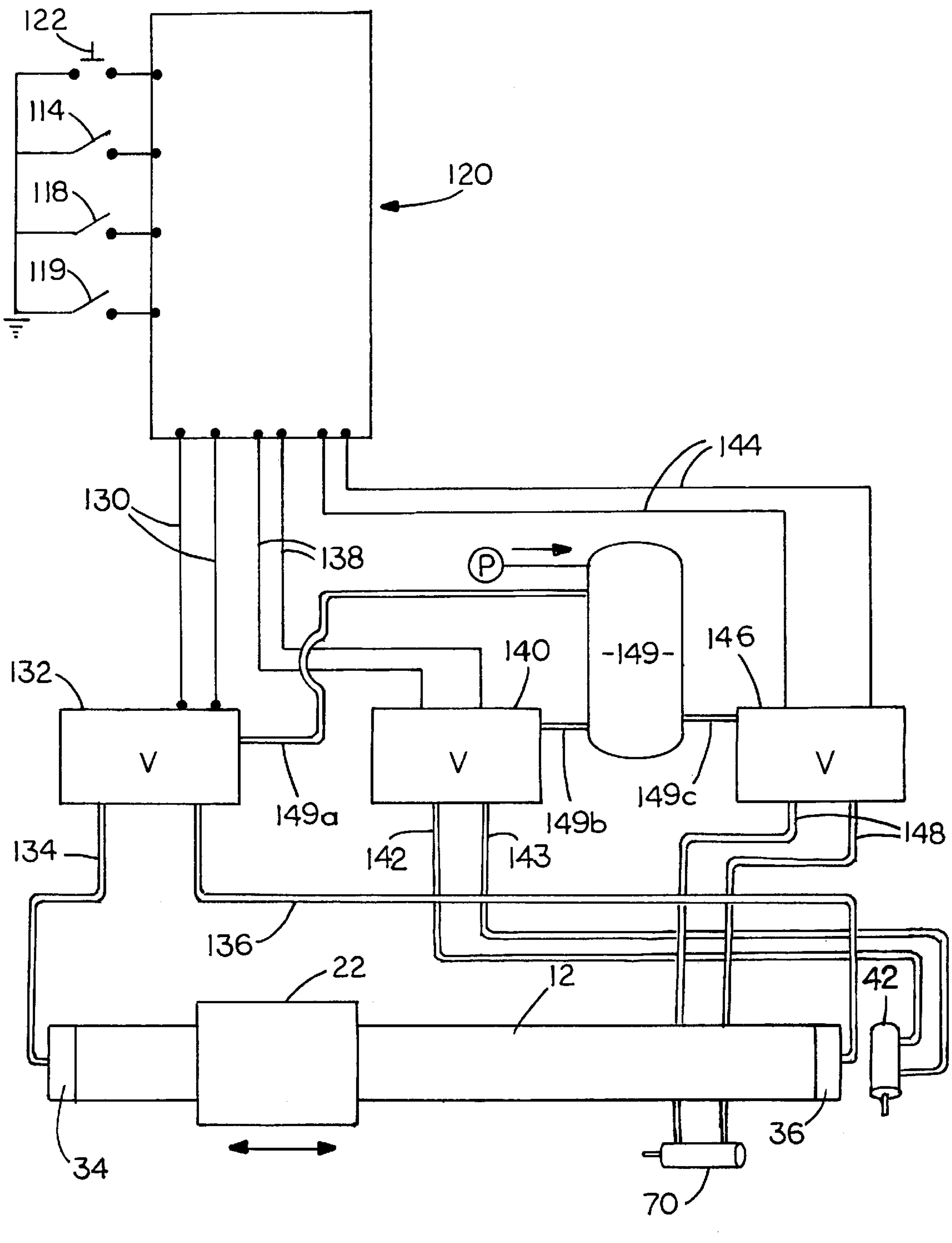

FIG. 7 is a schematic view of a programmable logic controller for controlling the operation of the invention.

Figures 8, 8A:
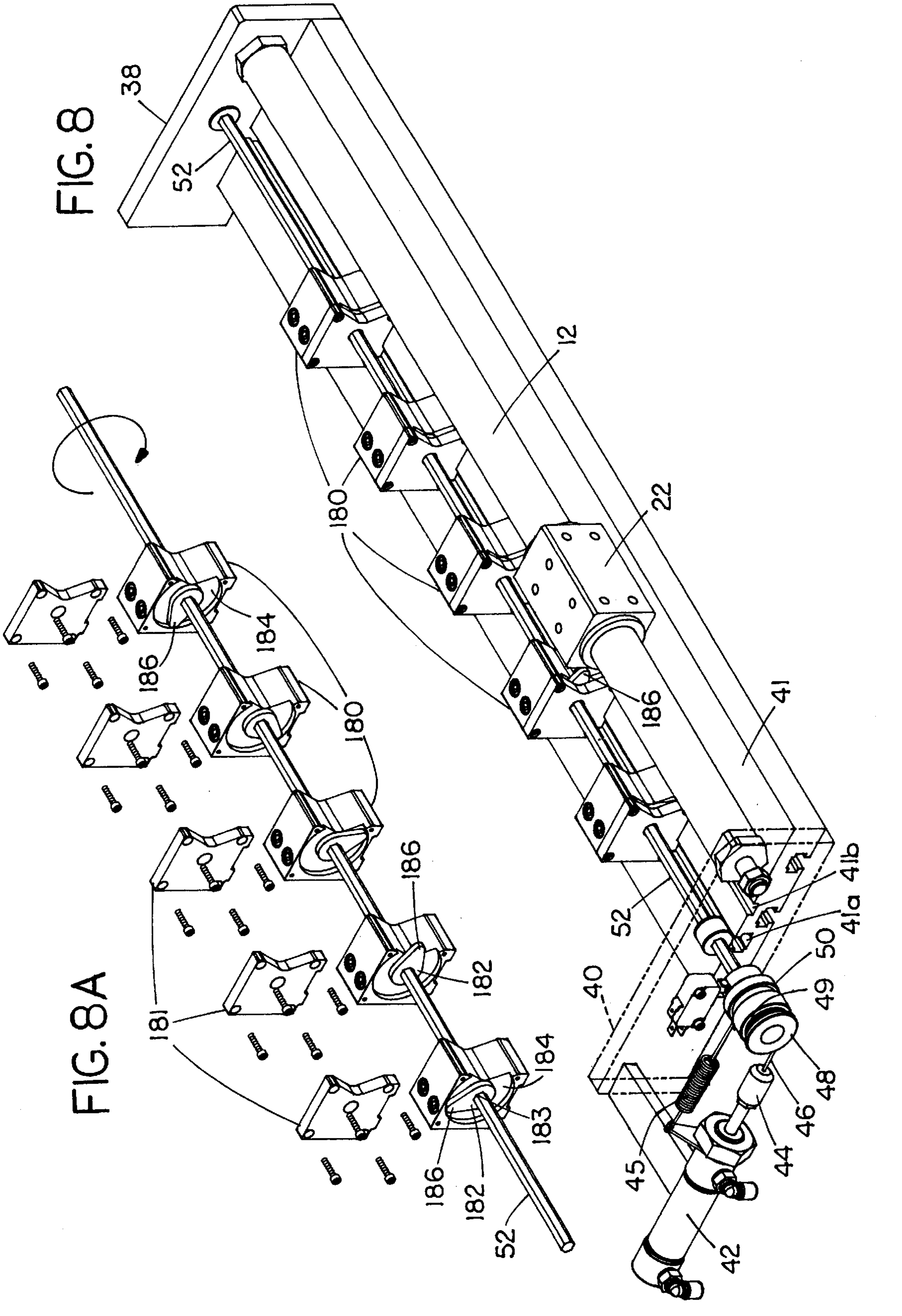

FIG. 8 is a perspective view of the invention using another form of stop assembly.

FIG. 8A is an exploded view of FIG. 8.

Figure 9:
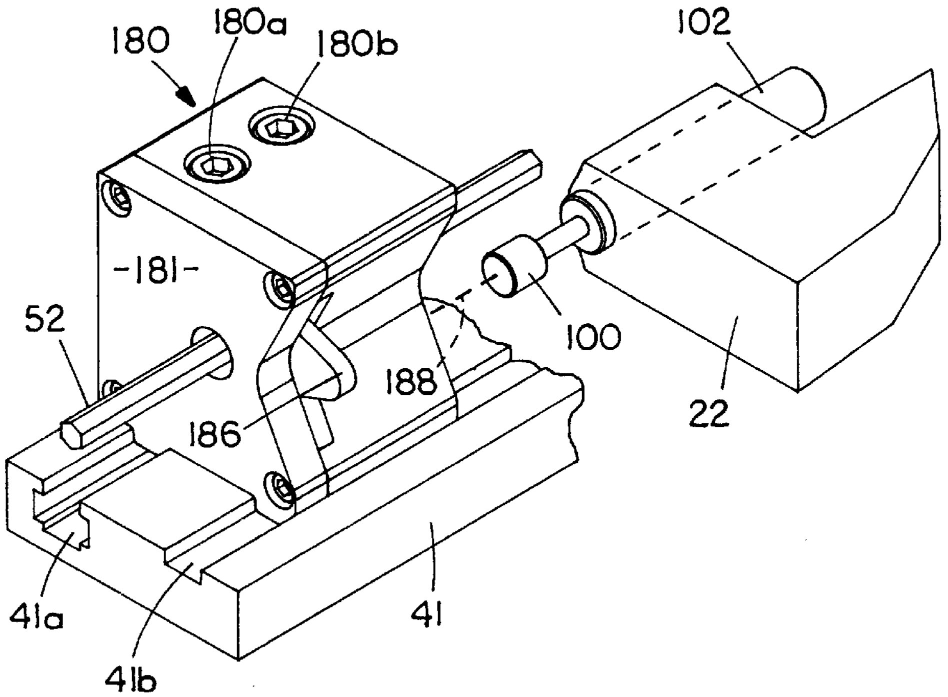

FIG. 9 is a perspective view on a larger scale of one of the stop blocks shown in FIGS. 8 and 8A.

Figure 9A:
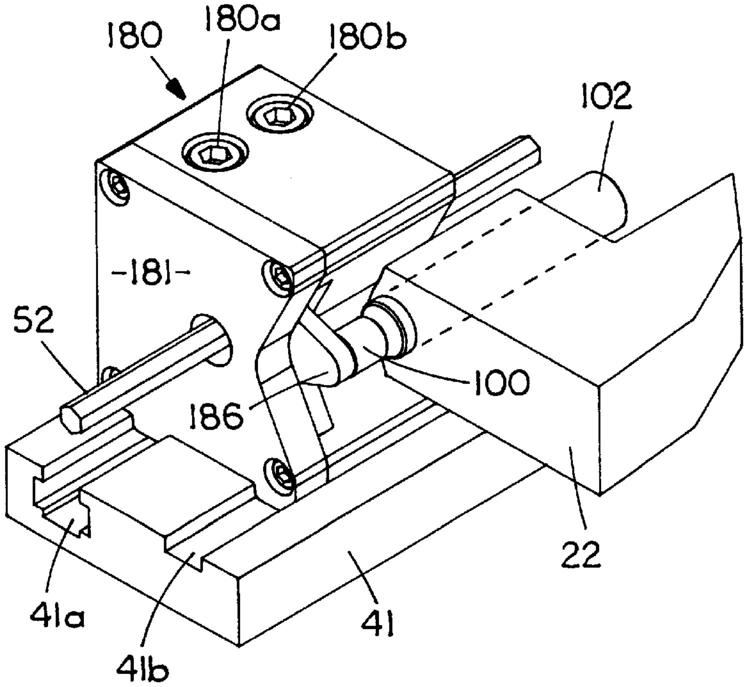

FIG. 9A is a view similar to FIG. 9 showing the stop block in operation.

Figure 10:
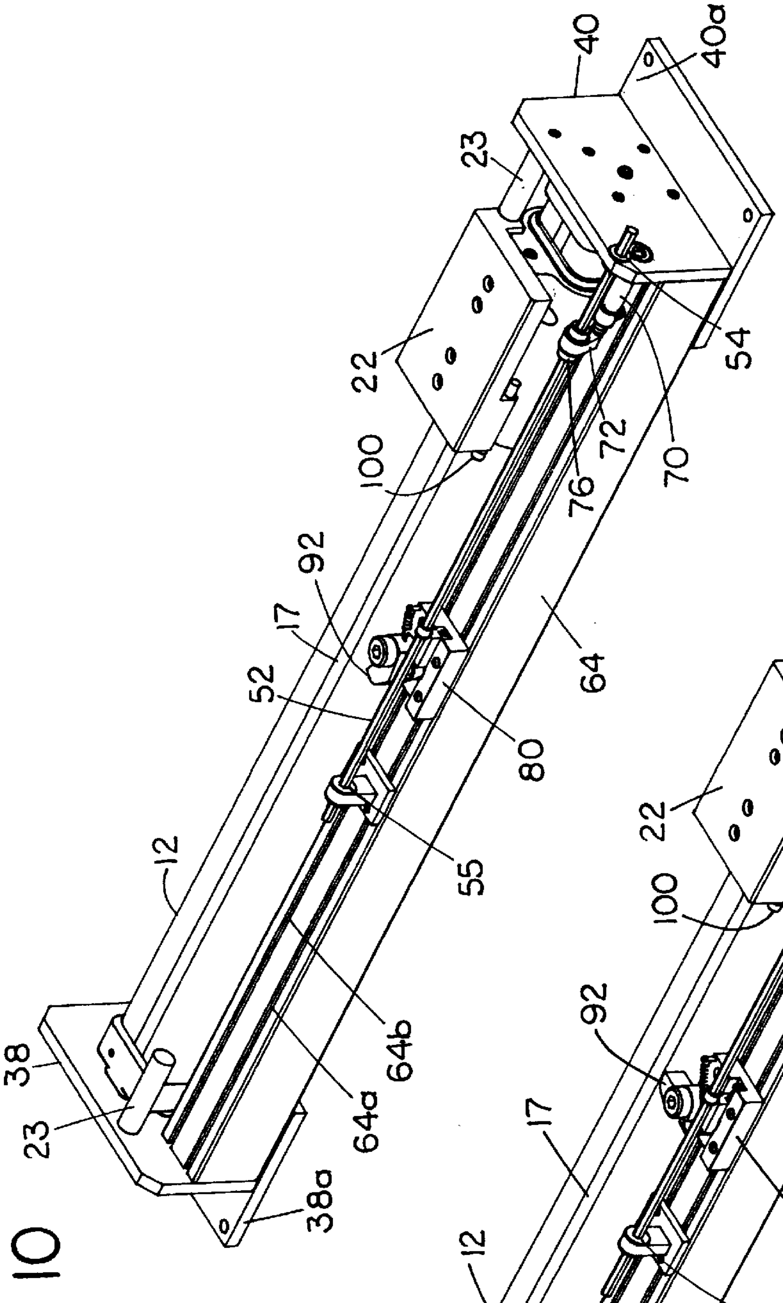
Figure 10A:
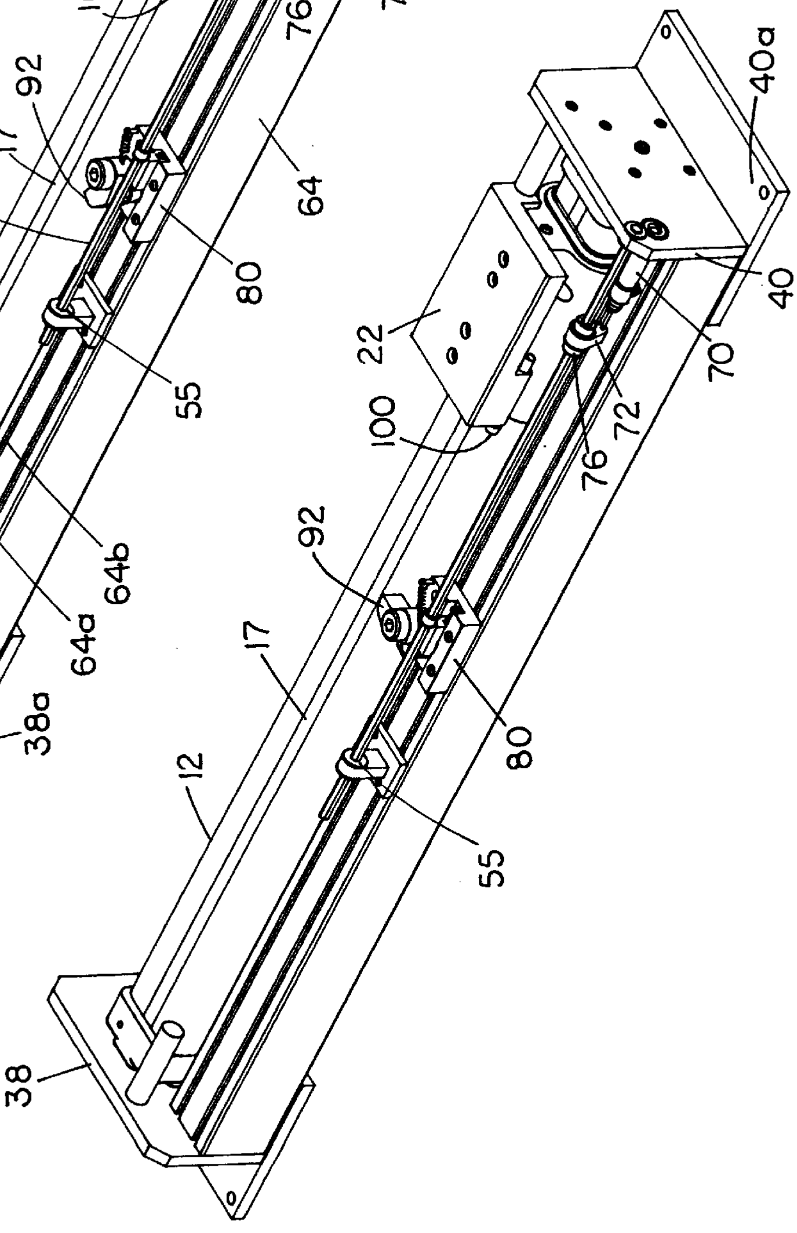
Figure 10B:
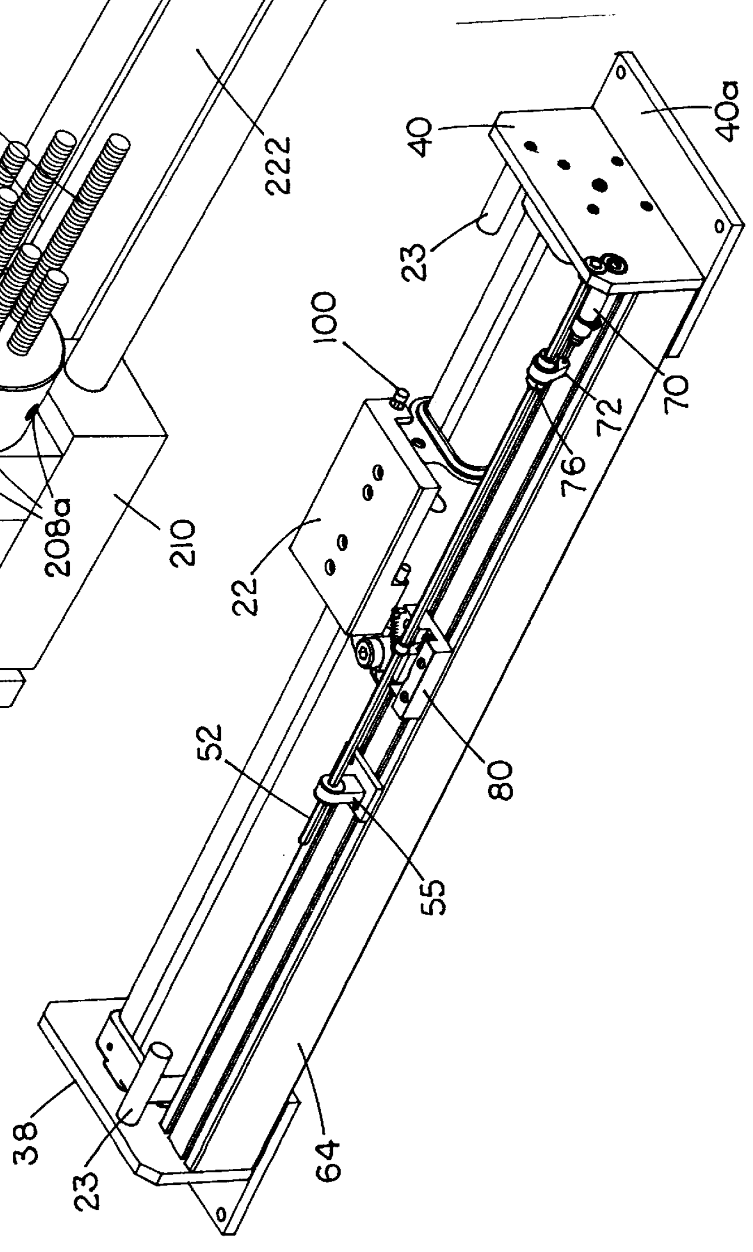

FIGS. 10–10B are perspective sequential views of the invention with only one stop block in use.

Figure 11:
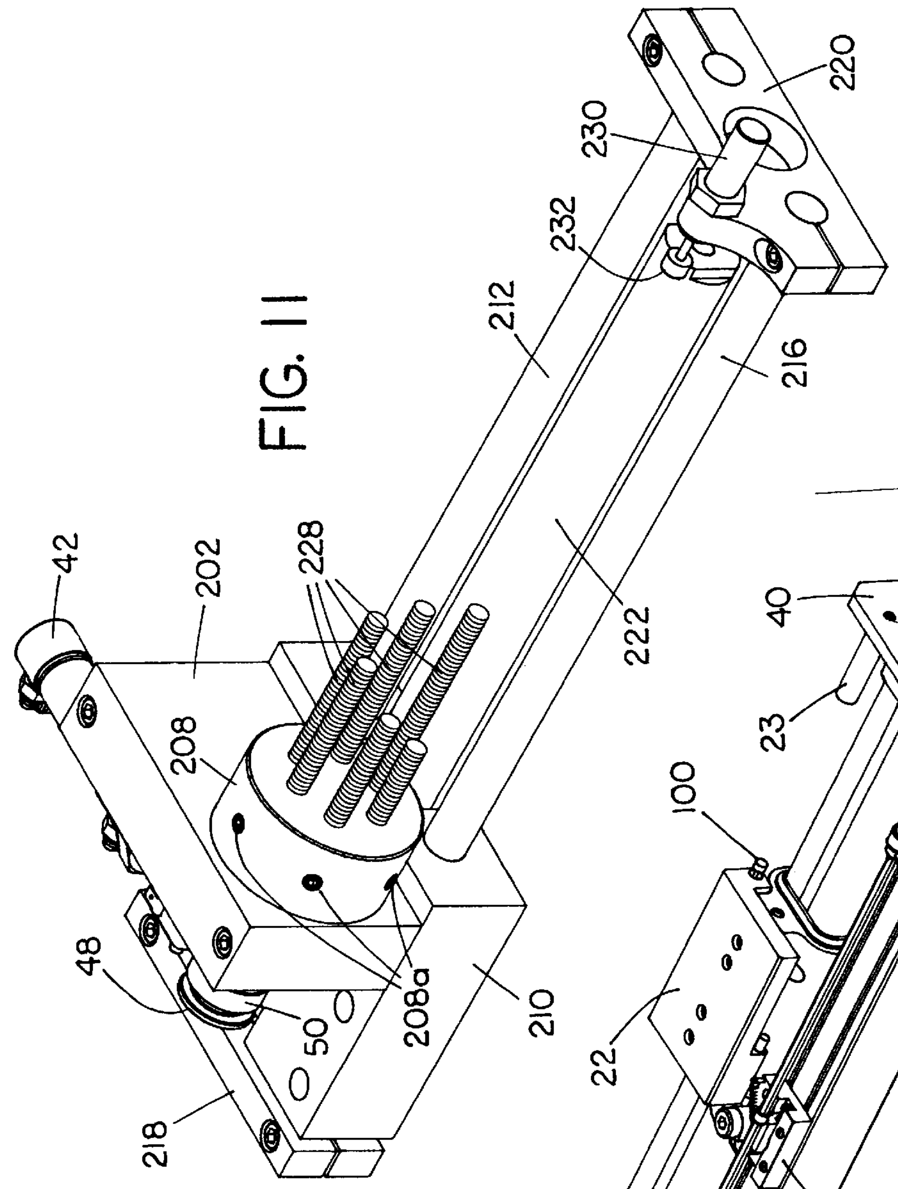
Figure 12:
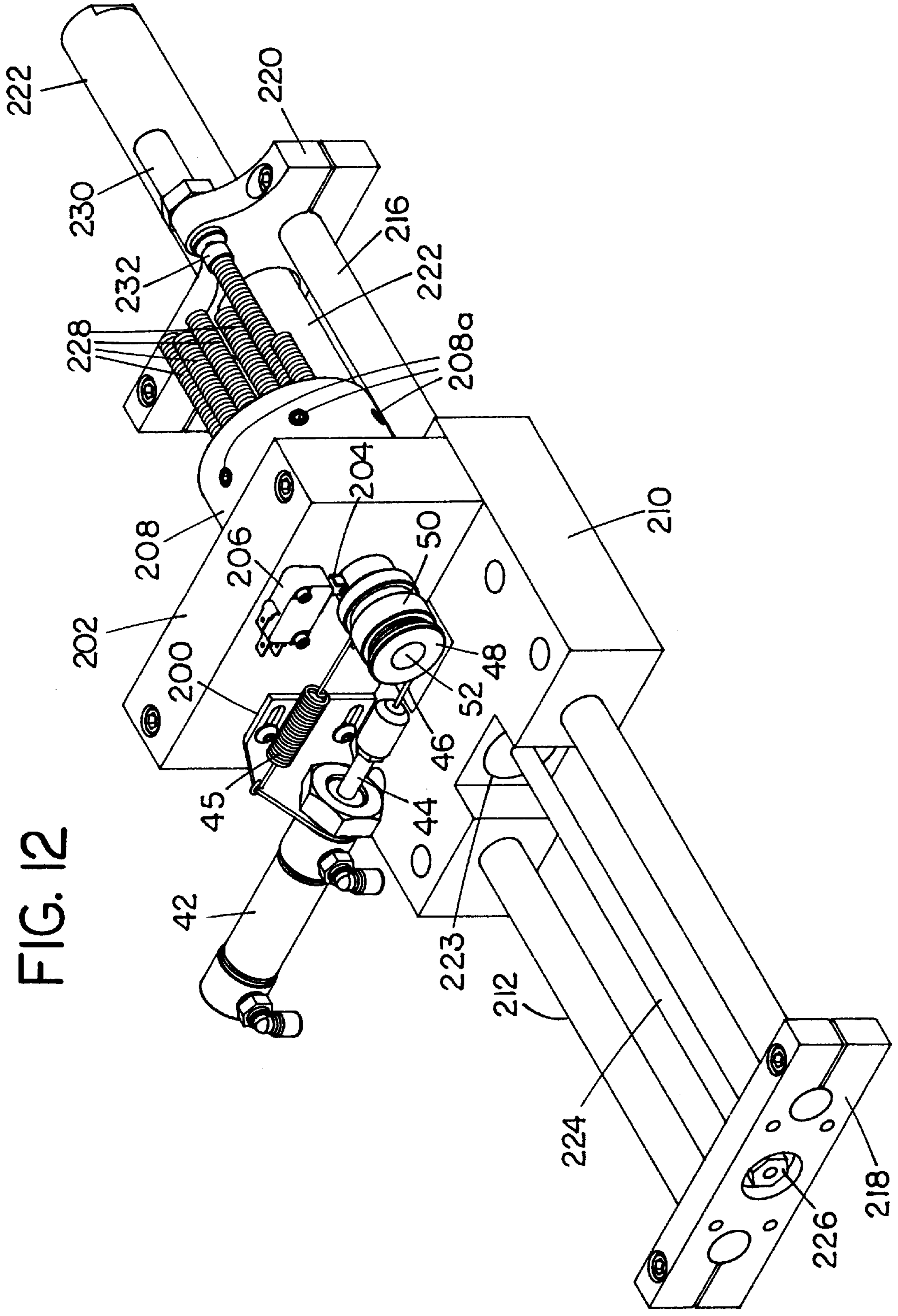

FIG. 11 is a front perspective view of another embodiment of the invention before the carriage has been moved to a selected position, and FIG. 12 is a rear perspective view of FIG. 11 with the carriage moved to a selected pre-set position.

DETAILED DESCRIPTION OF THE INVENTION

Refer now to FIGS. 1–7 which illustrate a bi-directional positioning apparatus having a carriage or other machine element that can be located at selected positions while traveling in either direction.

Figure 1:
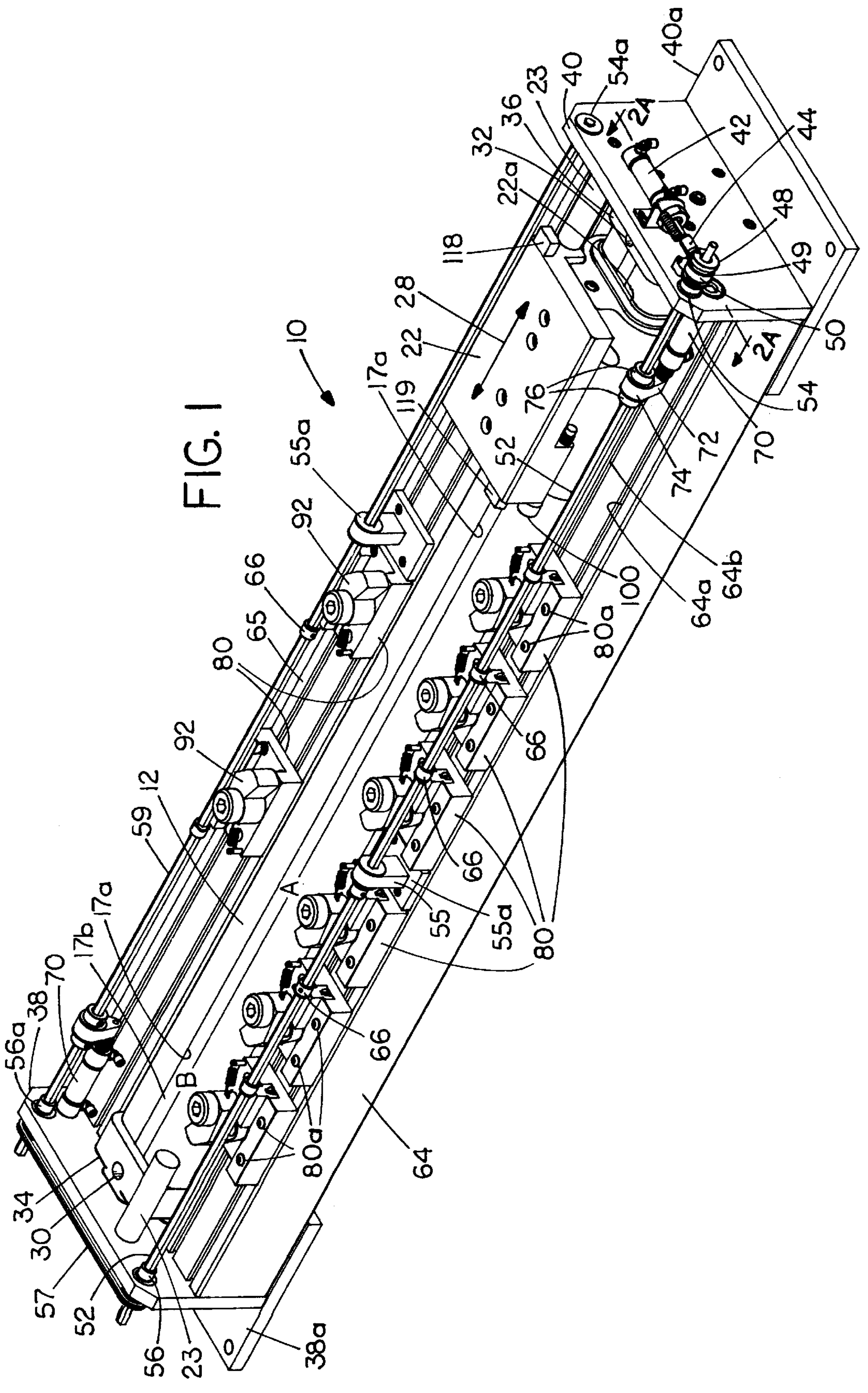
FIG. 1 is a perspective view of a preferred embodiment of the invention.
Figure 1A:
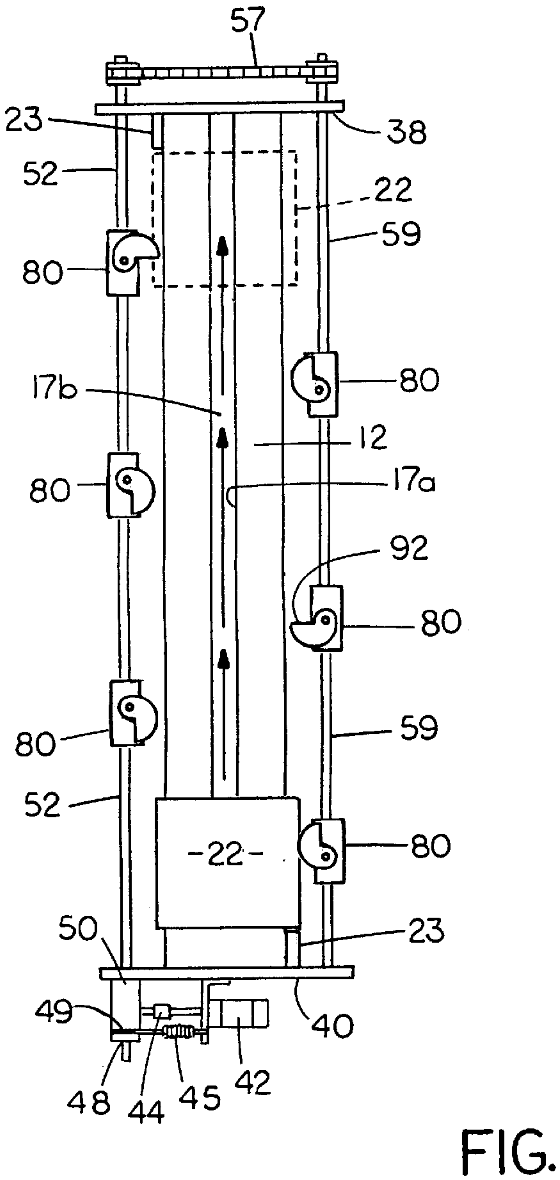
FIG. 1A is a diagrammatic plan view of the apparatus of FIG. 1.
Figure 2A:
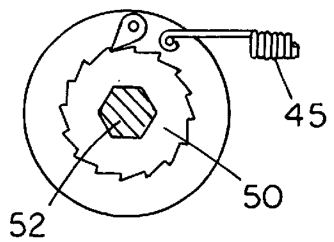
FIG. 2A is a vertical sectional view of the one-way clutch taken on line 2A—2A of FIG. 1.
Figure 2:
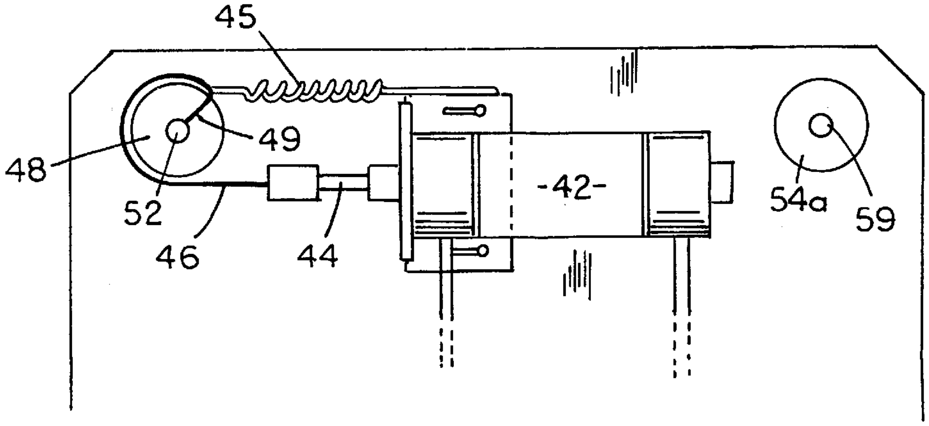
FIG. 2 is a right end elevational view of FIG. 1 on a larger scale.

Shown in FIGS. 1, 1A and 2 is a positive linear positioning apparatus 10 that can be used as a part of the present invention including an actuator assembly having a pneumatic band cylinder 12 that has a slot 17*a* or opening along the top which is sealed by means of a flexible sealing band 17*b*, e.g., a flexible plastic strip which seals the cylinder conventionally. Inside the cylinder 12 is a piston (not shown) that is connected to a sliding carriage or worktable 22 conventionally so that air can be held within the cylinder on both sides of the piston. Any suitable commercially available cylinder obtained from various manufacturers can be used in connection with the invention. The worktable 22 in turn is slidably mounted at 22*a* upon the cylinder 12 which enables it to slide longitudinally of the cylinder 12 along a rectilinear path or axis 28 responsive to air pressure changes on either side of the piston. Air is supplied to the cylinder 12 through air supply ports 30, 32 in cylinder heads 34 and 36, respectively. Thus, when the piston slides toward the right in the figure, the worktable 22 will also be carried to the right. It will be understood that the air pressure supplied through ports 30, 32 on opposite sides of the piston (not shown) will thus move the worktable 22 along axis 28 but by itself will be incapable of accurately locating the table at intermediate points and will thus provide only two terminal stop points, one located at each end of the cylinder 12 where the worktable 22 strikes the end of travel stops 23 at each end secured rigidly to the end plates 38 and 40, respectively. The carriage or worktable 22 can be further supported and stabilized by longitudinally extending, laterally spaced apart fixed guide rods (not shown) placed on each side of the pneumatic cylinder 12. The carriage 22 includes downwardly opening linear bearings that slide on the guide rods conventionally.

Mounting the worktable 22 on cylinder 12 provides a very compact structure. However, if desired, the invention can be applied just as well, in the alternative, to a worktable 22 secured to the end of a rigid connecting rod (not shown) that extends out of one end of the pneumatic cylinder 12. In such a case, the worktable 22 would not be positioned above the cylinder 12 as shown but instead would be at one end of the cylinder 12. The invention is applicable to either actuator type.

The selector mechanism used to provide multiple positioning of the worktable 22 will now be described with particular reference to FIGS. 1–5D.

Secured rigidly to the cylinder heads 34, 36, respectively, are a pair of end panels 38 and 40. To the outside of panel 40 is secured a stationary actuator assembly including an air cylinder 42 containing a movable piston (not shown) which is connected via connecting rod 44 to a cable 46 that is in turn wrapped around pulley 48 and secured at its end 49 to the pulley 48. The pulley 48 is in turn connected via one-way clutch 50 to an indexing shaft 52 (in this case hexagonal in cross-sectional shape) that is supported at its ends within bearings 54 and 56 in the panels 40 and 38 and by a centrally located bearing 55 carried on a support 55*a* secured to a fixed longitudinally extending frame member or support 64 comprising an extrusion that is rigidly fastened to panels 38*a* and 40*a*, e.g., by bolts (not shown). The frame member 64 can be an aluminum extrusion with two T-slots 64*a* and 64*b* formed in its upper surface. The hexagonal indexing shaft 52 is rotated repeatedly by means of the cylinder 42 in a series of indexing steps for selecting a stop point, each, by way of example, consisting of 60° steps to provide a total of 6 indexing steps to make one complete turn of the indexing shaft 52. The number of degrees traveled during each indexing step can be changed to suit the particular application in which the apparatus is used for the purpose of energizing a particular one of several stop assemblies 80 to be described below. Six steps of 60° serves as an example to illustrate a typical embodiment of the invention. The actuator cylinder 42 can be turned on and off manually, if desired, to index shaft 52 for selecting a stop point but is preferably operated by an automatic controller to be described.

Figure 4:
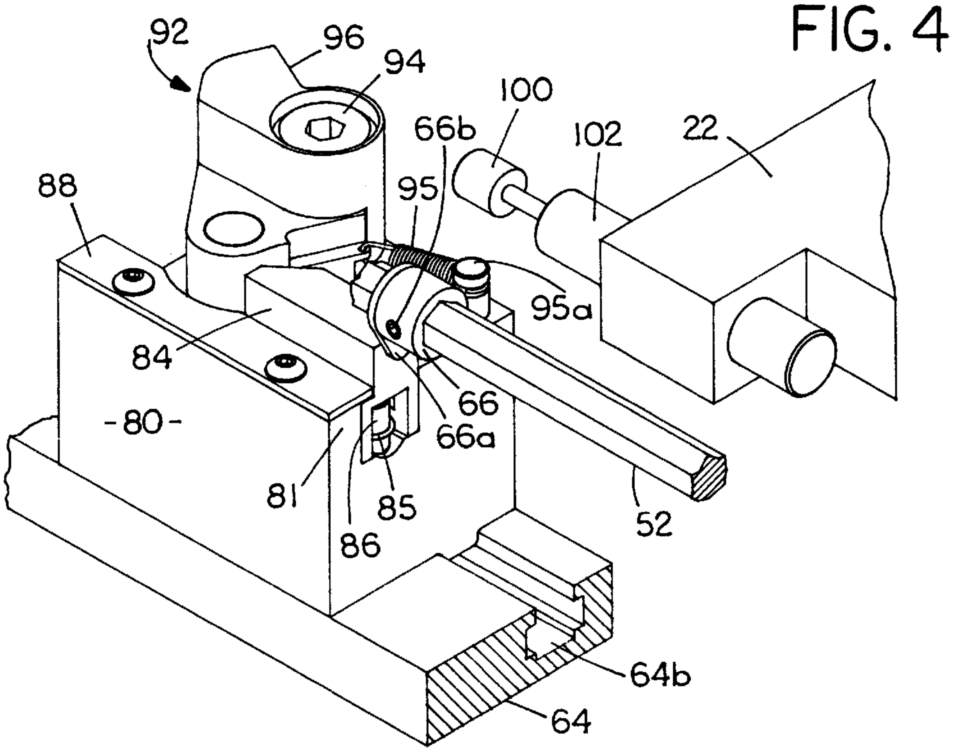
FIG. 4 is a perspective view of one of the stop assemblies as it appears just before the stop arm is moved to its extended position.

Distributed along the length of the indexing shaft 52 are six pressing sleeves 66, each having at least one pressing tab 66*a* (FIG. 4). Each of the pressing sleeves 66 is secured to the indexing shaft 52 by means of a set screw 66*b* such that the tab 66*a* of each sleeve extends in a different direction from the other tabs, so that in this case the tabs are spaced 60° apart circumferentially on the shaft 52.

The hexagonal indexing shaft 52 is slidably mounted for axial movement within its supporting bearings 54–56 so that it can be shifted axially during operation by means of a third pneumatic actuator comprising a cylinder 70 having an actuator connecting rod extending from its left end that is connected to a yoke 72, which is in turn secured at 74 between a pair of shaft collars 76 that are rigidly connected to shaft 52 for allowing rotation of shaft 52 while shifting the shaft 52 and sleeves 66 axially an appropriate distance, for example one inch, to the left in FIGS. 1 and 3–4A when the actuator 70 is extended toward the left.

At least one and possibly several identical stop assemblies or blocks 80 (FIG. 1) are provided. The stop blocks 80 are distributed axially in spaced apart selected locations along the length of the apparatus 10. Each stop block 80 is adjacent to and operatively associated with one of the pressing sleeves 66 and each stop block 80 is held in any selected manually adjustable position by means of screws 80*a* (FIG. 3A) which secure the stop blocks 80 within T-slots 64*a*, 64*b* of the stationary track or support member 64 that is itself rigidly connected to the end panels 38*a* and 40*a*. In a typical application of the invention for an automated robotic pick-and-place assembly operation or in any of a variety of factory automated robotic assembly or manufacturing applications, the stop blocks 80 enable the worktable 22 to be stopped at any of several selected precisely located stop points where work is to be performed or assembly steps are to be carried out. The position of each stop block 80 is infinitely variable because each block can be moved to and held at any point on the support member 64. To locate the worktable 22 at selected points, the operator slides the stop blocks 80 manually to the desired locations along the length of the support member 64 and then fastens each securely in place by means of the screws 80*a*. Each of the pressing sleeves 66 is then positioned accordingly at a point adjacent to the right end of one of the stop blocks 80 and is locked in place by its set screw 66*b*.

Figures 3, 3A:
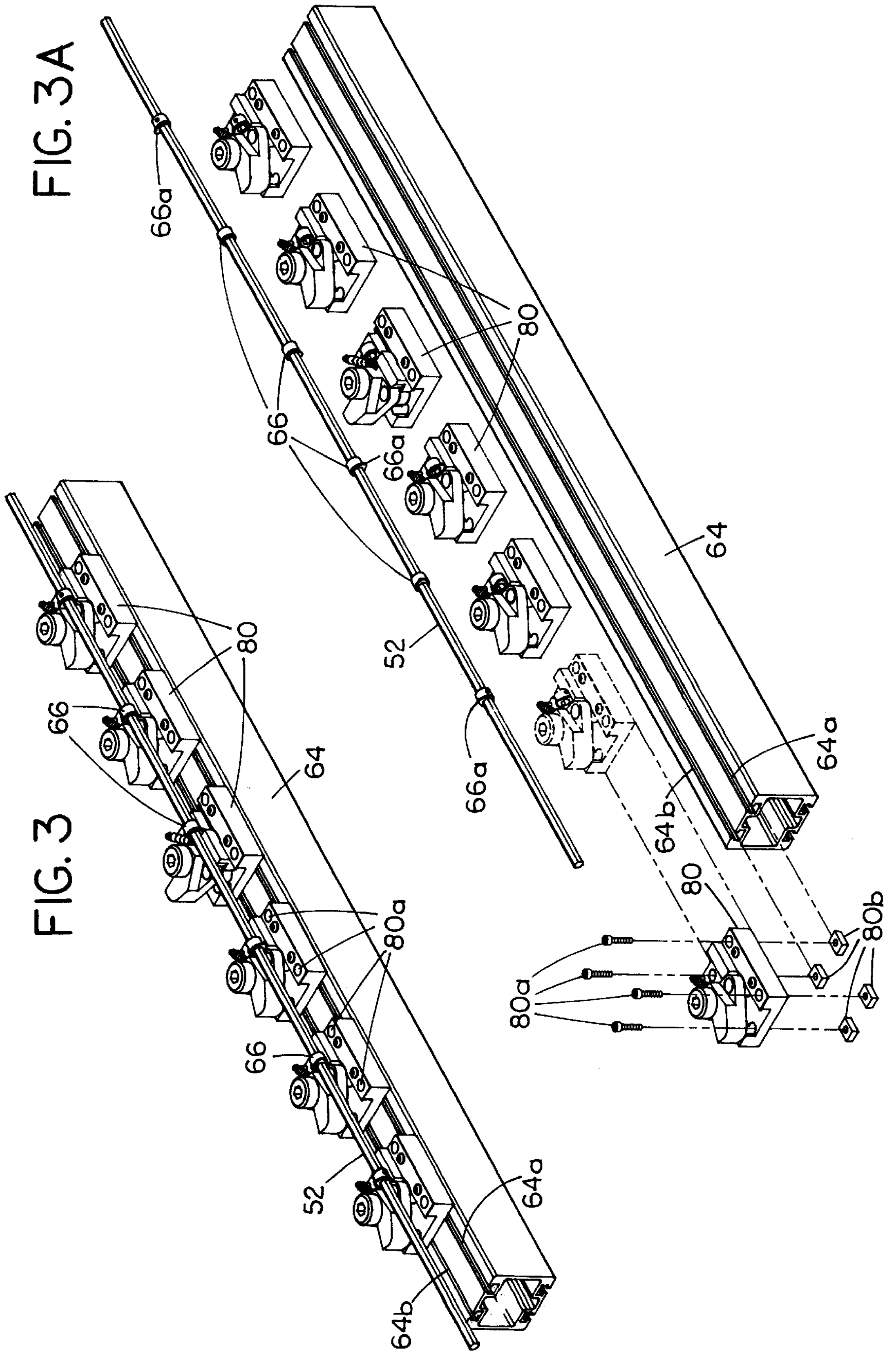
FIG. 3 is a diagrammatic view of six linearly arranged stop assemblies of FIG. 1 with the fourth stop assembly from the left in the operating or extended position.
FIG. 3A is an exploded view of FIG. 3.
Figure 4A:
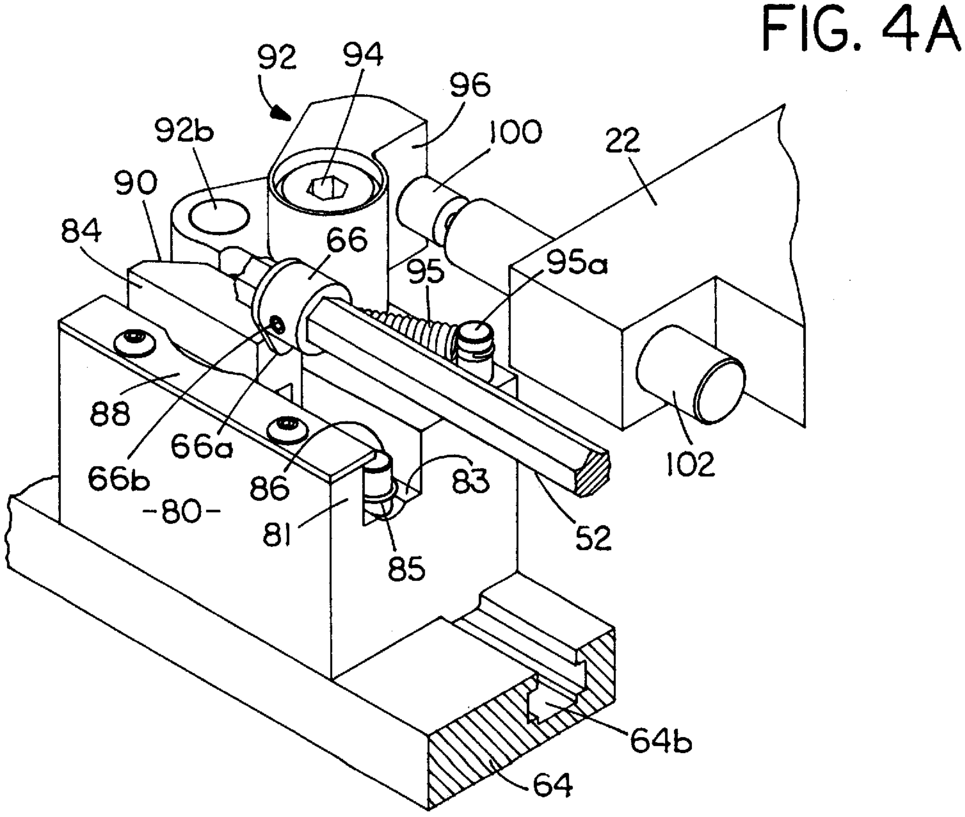
FIG. 4A is a perspective view of the stop assembly of FIG. 4 as it appears after the stop arm has been moved and locked in its extended position.

The construction of the stop blocks 80 will now be described with particular reference to FIGS. 4, 4A and 5A–5D. Each stop block 80 comprises a rectangular metal block having one or more downwardly extending flanges that extend into T-slots 64*a* and 64*b*. Each stop block 80 is secured to the support member 64 by fasteners such as the bolts 80*a* with nuts 80*b* located in the T-slots 64*a*, 64*b* as seen in FIG. 3A, thus allowing the stop blocks 80 to be positioned manually at any of an infinite number of locations. On top of stop block 80 is an upwardly facing, longitudinally extending slot 83 with a solid outer wall or abutment 81. Slidably supported in the slot 83 for longitudinal sliding action is a stop arm actuating and locking bar 84 which is urged toward the right in the figures by means of a helical return spring 85 (only a part of which is shown in FIG. 4A) attached to a pin 86 secured within the right end of slot 83. The bar 84 can be held in slot 83 by means of a retaining plate 88. The left end 90 of the locking bar 84 engages a roller 92*a* supported for rotation upon a pin 92*b* of a stop arm 92 which is itself mounted for pivotal movement upon a pivot pin 94 that is in turn affixed at its lower end, e.g., by means of screw threads, to the stop block 80. The stop arm 92 is normally retracted by being pivoted in a counter-clockwise direction to the position shown in FIG. 4 by means of a helical return spring 95 which is secured between the stop arm 92 and a pin 95*a* affixed to the stop block 80. In operation, the stop arm 92 has an operating face 96 that engages and stops the motion of the worktable 22 when the arm 92 is in the active mode, i.e., is extended to the operating position shown in FIG. 4A. Specifically, the operating face 96 of the stop arm 92, when extended by means of the locking bar 84, is located in the path of the worktable 22 to engage the bumper 100 of a shock absorber 102 which gently slows the movement of the worktable 22 until the extended bumper 100 reaches its seated position against the body of the shock absorber 102. It will be noted that in all embodiments of the invention the stop arm or stop lobe is retracted along a path leading away from the path of motion of the worktable. Consequently, the worktable does not have to be backed away from the stopped position for continuing movement in the same direction that it approached the stop assembly.

Figure 5A:
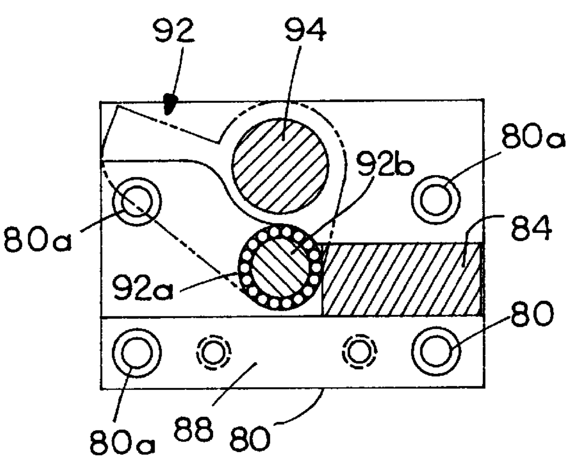
Figure 5B:
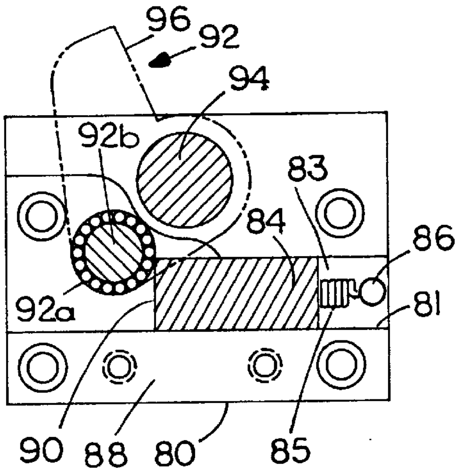
Figure 5C:
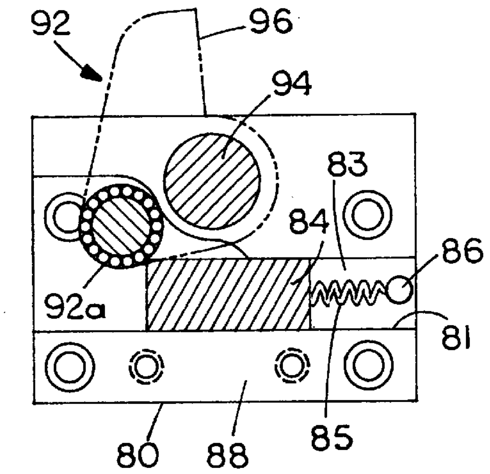
Figure 5D:
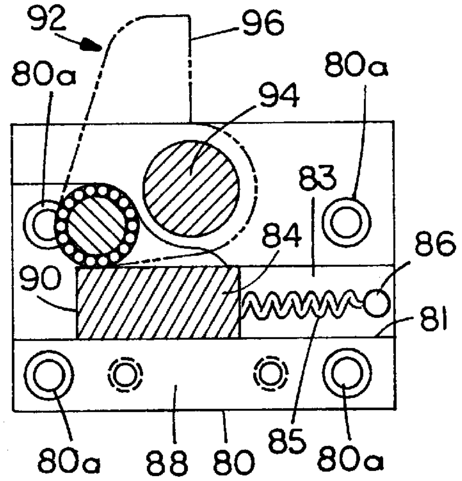

During operation, whichever one of the pressing sleeves 66 is selected to be used by rotation of shaft 52 is positioned with its operating tab 66*a* extending downwardly (FIG. 4A) into alignment with the locking bar 84 so as to engage and slide the locking bar 84 thus selected from right to left in FIGS. 4 and 4A as the actuator 70 shifts the indexing shaft 52 toward the left in the figures along its own axis, causing only the locking bar 84 of the selected stop block 80 to slide into engagement with the roller 92*a* of the corresponding stop arm 92, thereby pivoting only that stop arm 92 in a clockwise direction so as to extend that arm 92 to its operating position (FIG. 4A). The axial motion of indexing shaft 52 thus extends a selected one of the stop arms 92. Once the roller 92*a* has been moved to one side of locking bar 84 as shown in FIG. 5D, the continued motion of the locking bar 84 toward the left interposes the locking bar 84 bodily between the roller 92*a* and the wall 81 of slot 83. When this takes place, it can be seen that the locking bar 84 itself positively locks the stop arm 92 in place by wedging itself bodily between the roller 92*a* and the abutment formed by the wall 81 of the slot 83 so as to hold the stop arm 92 mechanically in the extended position.

It will be noted that the movable indexing shaft 52 extends between the linearly distributed stop assemblies 80 and is operatively associated with each of the stop assemblies 80. The shaft 52 functions as it is indexed repeatedly through a series of six indexing steps to make one complete turn of shaft 52 so as to sequentially place each successive stop arm 92 of each of the stop assemblies 80 in its operating or active mode. At a selected point, the rotational movement of the indexing shaft 52 is stopped so that only the selected stop arm 92 will be in the operating position. More specifically, the indexing shaft 52 rotates or indexes to align a particular pressing sleeve 66 with a stop assembly 80 at the selected stop point. The shaft 52 is then shifted along its own longitudinal axis by actuator 70 as described above to extend the selected stop arm 92 to its operating position.

Refer now to FIG. 6 which illustrates a homing mechanism for the indexing shaft 52 comprising a cam 110 secured, e.g., by means of welding or a set screw (not shown), to the indexing shaft 52. The cam 110 has a single slot 112 which is operatively associated with the arm of a microswitch 114 connected by means of conductors 116 to a controller 120 to be described below. The location of the worktable 22 is detected by two magnetic proximity switches 118 and 119 (FIGS. 1 and 7), one for each direction of travel, which are wired to a controller 120 to be described below.

Refer now to the controller 120 which will be described in more detail by reference to FIG. 7. The controller 120 can comprise any suitable electrical or electronic controller of suitable known construction, such as a Programmable Logic Controller (PLC). The PLC 120 is provided with inputs at the left that in many applications typically include a start switch 122, the homing switch 114 just described, and the proximity switches 118 and 119 mentioned above. PLC 120 is connected via conductors 130 to a pneumatic valve 132 that is coupled by air lines 134 and 136 to the cylinder heads 34, 36 of the cylinder 12. Conductors 138 are connected to pneumatic valve 140 that is coupled via air lines 142, 143 to opposite ends of the cylinder actuator 42. Conductors 144 are connected to an air valve 146 which are connected via air lines 148 to the opposite ends of the cylinder 70. The valves 132, 140 and 146 are supplied with compressed air from air tank 149 through lines 149*a,* 149*b* and 149*c* so that the cylinders 12, 42 and 70 are powered by a common energy source, in this case compressed air from tank 149.

The operation of the device will now be described. The apparatus is first turned on by means of the start switch 122 which begins the cycle. The home switch 114 sets the device to the start position shown in FIG. 1. The initial operation of the cylinder 12 will move the worktable 22 until it reaches "home" as detected by switch 118. When the cylinder 42 is indexed repeatedly, the indexing shaft 52 will rotate repeatedly through increments of 60° until switch 114 (FIGS. 6 and 7) closes, thus indicating the desired home position has been reached, whereupon the PLC 120 will stop the indexing rotation of indexing shaft 52.

Any suitable operating program for the PLC 120, which has been previously entered, can now begin. With reference to FIG. 1, assuming the stop points are numbered 1–8 from right to left with the stop blocks 80 comprising stop points numbered 2–7, the controller 120 can be set to lock the worktable 22 at selected points sequentially 1–6 or 8–1 or, if desired, at random points, e.g., 1, 6, 4, 3, 2, 5, etc. For example, assuming the worktable 22 is at the fourth position from the right at A and it is desired to move it two positions to the left at B, the actuator 42 is programmed to index twice, causing the indexing shaft 52 to index twice through an arc totaling 120° so as to locate the pressing sleeve 66 adjacent the stop block 80 at the left end of FIG. 1 (position B) in a downwardly extending position and immediately thereafter actuate the cylinder 70 once, thereby shifting the indexing shaft 52 toward the left so that the tab 66*a* adjacent the stop block 80 at B will then engage the corresponding locking bar 84 and force it toward the left thereby extending the stop arm 92 of the stop assembly 80 at the left in FIG. 1. The stop arm 92 of the stop block at A will be released to its retracted position as soon as the cylinder 70 retracts, thereby releasing the worktable 22 so that air pressure in the cylinder 12 is able to continue moving it toward the left in the figures into engagement with the extended stop arm 92 of the stop block at B. In this way, the worktable 22 can be moved without having to first back up, enabling it to move to stop points either in sequence or out of sequence to any of the points selected, i.e., in any desired order. Thus, the invention is well suited for multi-point positioning in a sequentially ascending order, e.g., positions 1, 2, 3, 4, 5, etc., but can also be used for random sequencing, e.g., positions 1, 7, 5, 2, 6, 3, etc.

In the embodiment shown in FIG. 1, there are six stop blocks 80 on the left side of the apparatus and two optional stop blocks 80 are provided on the right side, the latter being operated by means of an indexing shaft 59 (similar to shaft 52 already described) which is supported for rotation in bearings 54*a,* 55*a* and 56*a.* The stop blocks 80 on the side of the cylinder 12 closest to the observer stop the motion of the carriage 22 as it moves from right to left in the figure. It will be seen that the arms 92 of the stop blocks 80 on the other side of the apparatus face the left end of the cylinder 12 as seen in the figure for the purpose of stopping the motion of the carriage 22 as it moves from left to right.

The indexing shafts 52 and 59 are connected at their left ends in FIG. 1 with a chain and sprocket assembly 57 (or with a timing belt) to keep the shafts 52 and 59 synchronized with each other. On the other side of the cylinder 12 are provided any desired number of stop assemblies 80 positioned so that each stop arm 92 when extended faces the left in FIG. 1 (the top of FIG. 1A). Thus, during operation when the worktable 22 moves toward the top of FIG. 1A, any of the stop assemblies 80 on the left side are capable of stopping the movement of the table. At the end of the stroke of cylinder 12, when the worktable 22 reaches the dotted line position, its motion is reversed. During the reverse motion toward the bottom of the figure, any of the stop assemblies 80 on the right side of the figure can be used to stop the motion of the worktable 22 at the desired stop point through extension of the corresponding stop arm 92 as described above. The embodiment of FIGS. 1–5D is suited for handling relatively heavy loads, e.g. exerting a 400–500 pound force on the carriage or worktable 22, and is capable of locating it in any selected position with an accuracy of up to 0.001 inch. In larger size units, more than six stop assemblies 80 can be employed along the length of a hexagonal indexing shaft 52. In operation, the switches 118 and 119 confirm that the worktable 22 has been stopped at the selected stop assembly 80. When more than six stop assemblies are required for a specific application, a 60° indexing shaft can still be used. When the worktable 22 is moved from stop block position #6 to stop block position #7 (not shown in FIGS. 1–5), the stop block at position #7 will operate under the same conditions as stop block position #1, i.e. both of the stop arms 92 of positions #1 and #7 are extended. It makes no difference that the stop block 80 at position #1 has its stop arm 92 in the extended position, since the carriage 22 has already passed that point so that only the stop block at position #7 is active in stopping the carriage 22.

Refer now to FIGS. 8–9A which illustrate an alternative form of the invention in which the same numerals refer to corresponding parts already described. To show how various forms of actuators can be used, the invention will be described for use in conjunction with a pneumatic actuator 12 that is magnetically coupled to the carriage 22 in a manner well known to those skilled in the art, by the provision of aligned cooperating permanent magnets that are located within the carriage 22 and on the piston (not shown) of the actuator 12 to keep the carriage 22 coupled with the actuator piston. For convenience, this type of actuator is referred to as a "magnetically coupled actuator." Any suitable commercially available magnetically coupled actuator can be employed in connection with the invention. In this embodiment the pressing sleeves 66, locking bars 84 and pivoting stop arms 92 are not needed and have been eliminated. A different form of stop block is designated generally by numeral 180. Each of the stop blocks 180 has a stop plate 182 with a polygonal-shaped central opening 183 (in this case a hexagonal opening) which is slidably mounted on the hexagonal indexing shaft 52 and is supported for rotational movement within a recess 184 within the stop block 180 of just sufficient depth to allow each stop plate 182 to rotate freely but with virtually no axial motion so that the recess 184 which is closed by a cover 181 serves as a thrust bearing. Each stop block 180 is secured to the track 41 in any desired position by means of bolts 180*a* and 180*b* which are threaded into nuts (not shown) located within the T-slot 41*a*. A portion of the stop block 180 also extends into the adjacent slot 41*b* within the track 41 to provide additional support. Each opening 183 within the stop plate 182 corresponds in shape to that of shaft 52 so that the plate 182 will rotate with the latter. Each stop plate 182 is provided with a radially extending stop lobe 186 and each lobe 186 points in a different direction. In this case the lobes 182 are each spaced from adjacent lobes circumferentially by an angle of 60°. In FIG. 8A it can be seen that the stop members 182 are positioned on the shaft 52 with the lobes 186 located 60° apart. Each of the stop lobes 186 serves as a stop member or arm when extended toward the right as in FIG. 9 to an operating position directly in the path indicated by dotted line 188 aligned with the bumper 100 of the shock absorber 102 connected to worktable 22. The embodiment of FIGS. 8–9A is especially well suited for smaller bore cylinders which are used in lighter load positioning applications.

During operation, the indexing shaft 52 is indexed by being rotated as described above so as to position a selected one of the stop lobes 186 in an operating position extending toward the right and located on axis 188 so that when the cylinder 12 drives the worktable 22 toward the left in FIG. 9, the shock absorber 102 will decelerate the worktable 22 until the bumper 100 makes contact with the shock absorber 102, thereby stopping the worktable 22 precisely at the selected stop point. It can be seen that if the shaft 52 is rotated an additional 60° from the position shown in FIG. 8A, none of the stop lobes 186 will be in the extended position, and accordingly the carriage 22 will be free to travel throughout its full stroke without striking any of the stop blocks 180. It should also be noted that in this case there is no need to shift the indexing shaft 52 along its own axis and, consequently, the cylinder 70 and the associated structure for moving the shaft 52 axially can be eliminated. The vertical wall of the recess 184 and cover 181 engaging the parallel faces of the stop plate 182 serve as a positive mechanical element for retaining the stop plate 182 in its operating position when the lobe 186 strikes the shock absorber 102 of the worktable 22. The walls of the recess 184 and cover 181 act as a thrust bearing engaged with the parallel front and rear surfaces of the stop plate 182. The embodiment of FIG. 8 has the advantage of being simpler in construction since it requires fewer parts.

The embodiment of FIGS. 8–9A can be operated differently from that of FIGS. 1–7. In the embodiment of FIGS. 1–7, the stop blocks 80 can be operated so that all six of the stop arms 92 are initially retracted. Then, when the operating cylinder 70 is actuated so as to slide the shaft 52 axially, one of the stop arms 92, depending upon the rotational position of the shaft 52, will be extended. If none of the stop arms 92 are extended, the carriage 22 will slide all the way toward the left in the figure until it strikes the end stop 23 which determines the location of an eighth position. Then, if on the return trip (toward the right in FIG. 1) the carriage 22 is not stopped by one of the two stop arms 92 on the far side of the apparatus from the observer, it will travel all the way toward the right and strike the end position stop 23 at the right end of the apparatus which defines another position; position #1. However, the preferred operation of the embodiment of FIGS. 8–9A is somewhat different. In this case it is preferred to use five stop blocks 180 for a six-sided indexing shaft 52 so that there is a rotational position of shaft 52 in which there is no lobe 186 aligned with the bumper of the shock absorber 102. This position of shaft 52 allows the carriage 22 to travel freely all the way from one end of its stroke to the other. In any other rotational position of the shaft 52, the carriage 22 will come to rest adjacent a stop block 180 where the lobe 186 is extended as shown in the second stop block from the left in FIGS. 8 and 8A.

As noted above, the stop lobes 186 are spaced radially from one another at 60° increments but since only five are provided there is always one position of the shaft 52 in which none of the stop arms 182 are in an extended or active position, i.e. all are 'off' in one selected position of the shaft 52. This simplifies the control of the apparatus. It will also be understood that one less valve is needed since the shifting actuator 70 is not required. In with the embodiment of FIGS. 8–9A, like FIGS. 1–7, any number of stop blocks, e.g. 20 blocks, can be used if required. In that case, every seventh block becomes functional under the same conditions as stop block #1.

FIGS. 10–10B illustrate a uni-directional positioning unit in which most of the stop blocks 80 have been removed so that a single stop block 80 is employed for locating the carriage 22 at the position shown in FIG. 10B while traveling from right to left in the figure. When the stop arm 92 of the stop block 80 is in the retracted position, the carriage 22 is capable of moving past the stop block 80 the full length of its stroke, i.e. all the way toward the left in the figure, until it strikes the end of travel or end position stop 23. It will also be noted in FIGS. 10–10B that, since there is only one stop block 80, the shaft 52 does not need to be rotated to move it to a selected position. Accordingly, components 42–50 for rotating the shaft 52 are not needed and can be eliminated since no rotational indexing is required.

Refer now to FIGS. 11 and 12 which illustrate how the invention can be employed with a different form of stop member. The same numerals refer to corresponding parts already described.

In this case, the indexing or selecting actuator 42 is supported on a bracket 200 which is secured to a vertical plate member 202 that is attached rigidly, e.g. by bolts, to a fixed base 210. A pair of parallel, laterally spaced apart slide rods 212, 216 are slidably mounted on the base 210 and are secured rigidly at their ends to end plates 218, 220, either one of which comprises a moving carriage or worktable. Between the slide rods 212, 216 is an actuator assembly such as a pneumatic actuator 222 that has a moving actuator rod 224 which is bolted at 226 to the end plate 218. The casing of the actuator 222 is rigidly affixed at 223 to the base 210 so that the operation of the actuator 222 moves the end plates 218, 220 during operation toward the left or right. The one-way clutch 50 functions as already described to select a stop point by rotating the indexing shaft 52 through a succession of angular indexing steps of 60° each. In this case the shaft 52 is journaled for rotation in the plate 202. The shaft 52 has a cam slot 204 that extends radially from it in position to actuate a homing switch 206 similar to switch 114 already described. Connected to the shaft 52 is a hub 208 that is provided with six parallel, circumferentially spaced apart, selectively extensible stop members 228 each equidistant from the axis of the indexing shaft 52. Each of the stop members 228 is a threaded rod which is screw-threaded into one of six parallel, circumferentially distributed threaded holes that are separated from adjacent holes by an arc which is equal to the angle subtended by each index step produced by the actuator 42 and one-way clutch 50, in this case 60° each. The hub 208 can be provided with a plurality of set screws 208*a,* one for holding each of the stop members 228 in a manually selected position.

The end plate 218 or 220 can be connected to any kind of movable machine element, such as the head of a milling machine, drill press, lathe or can be used to mount any kind of end effector, e.g. a vacuum cup or pneumatic gripper to pick up and place a component or workpiece which requires positioning in a plurality of selected positions.

Prior to operation, the threaded stop members 228 are each selectively extended from hub 208 manually by screwing them in or out of the threaded holes within the hub 208. Thus, the stop members 228 are extended from the hub to any selected infinite number of possible positions to determine a selected stop point for that stop member. Each of the stop members 228 is then locked in place with one of the set screws 208*a*. Prior to energizing the actuator 222 to move the end plates 218 and 220 from their starting point as shown in FIG. 11, the actuator 42 of the indexing shaft 52 is operated any desired number of indexing steps so as to rotate the shaft 52 through a predetermined arc equal to the sum of the indexing steps. This will position a selected stop member 228 in alignment with a bumper 232 and shock absorber 230 that is mounted on end plate 220. Then, when the actuator 222 is energized, the end plates 218, 220 will travel from right to left in FIG. 11 until the selected stop member 228 strikes the bumper 232 of the shock absorber 230, thereby precisely holding the end plates 218, 220 in the desired position as shown in FIG. 12. It will be seen that each of the stop members 228 projects a different distance from the base 210 and hub 208 to thereby stop the rectilinear movement of the end plates 218, 220 at a different point, thereby positioning them in a plurality of different stop points, one after the other as each stop member 228 is selected. Because the stop members 228 can be threaded in or out of the hub 208 any desired distance, the selected positions taken by the end plates 218, 220 can be varied infinitely, thus enabling the end plates to be positioned precisely at any of an infinite number of positions. This form of the invention, while very precise, is not as well suited for long stroke applications or for achieving large numbers of positions because it is limited to the number of stop members 228 that can be placed on the hub 208.

Many variations of the present invention within the scope of the appended claims will be apparent to those skilled in the art once the principles described herein are understood.

What is claimed is:

1. A linear positioning system comprising:

a first positioning actuator assembly including a cylinder and a movable piston, said assembly being operatively connected to a worktable for moving the worktable along a rectilinear path, a second actuator assembly comprising a cylinder and a piston therein, the first and second actuator assemblies being operated by fluid power for energizing said actuator assemblies, at least one stop assembly having a stop member which is movable to an operating position that is located so as to engage and stop the movement of the worktable at a selected stop point, and the second actuator assembly is operatively associated with at least one stop member for selecting a stop member to engage and stop the movement of the worktable at a selected stop point, and the second actuator assembly is an indexing actuator, the indexing actuator is connected to a rotatable indexing shaft, and the indexing shaft is operatively associated with the stop member for stopping the worktable when the shaft is indexed to a selected rotational position by the second actuator.

2. A linear positioning system comprising:

a first positioning actuator assembly including a cylinder and a movable piston, said assembly being operatively connected to a worktable for moving the worktable along a rectilinear path, a second actuator assembly comprising a cylinder and a piston therein, the first and second actuator assemblies being operated by fluid power for energizing the said actuator assemblies, at least one stop assembly having a stop member which is movable to an operating position that is located so as to engage and stop the movement of the worktable at a selected stop point, the second actuator assembly is operatively associated with at least one stop member for selecting a stop member to engage and stop the movement of the worktable at a selected stop point, and a plurality of stop assemblies is provided, one of said stop members is mounted upon each of the stop assemblies, and the second actuator is an indexing actuator connected to an indexable member to move the indexable member to a selected one of a plurality of positions for placing a stop member of one of said stop assemblies in an operating position.

3. The apparatus of claim 2 wherein the indexable member is shiftable axially and the axial movement of the indexing member is operatively connected to shift a selected stop member to the operating position for engaging and stopping the worktable.

4. The apparatus of claim 2 wherein each stop assembly is adjustably held in a selected position upon a support member to precisely locate said stop point.

5. The apparatus of claim 4 wherein the stop member is rotatably mounted on the stop assembly and is movable to said operating position by rotation of the stop member.

6. An apparatus for positioning a worktable that is connected to a pneumatic actuator including a cylinder and a piston for moving the worktable along a rectilinear path, said apparatus comprising:

a stop block adapted to be secured at a desired stop point along said path, a movable stop arm mounted on the stop block for movement between a retracted position and an extended operating position that engages the worktable to halt the movement of the worktable at a selected stop point, a movable member operatively connected to the stop arm for extending the stop arm from its retracted to said extended operating position, a lock for holding the stop arm in its extended operating position, and the movable member is a slide block having a surface adapted to engage the stop arm and also having a portion comprising said lock that is adapted to move between the stop arm and an abutment for mechanically locking the stop arm in said extended position.

7. The linear positioning system of claim 6 wherein an actuator comprising a cylinder and piston is operatively associated with the stop block for extending the selected stop arm to the operating position.

8. The apparatus of claim 6 wherein the stop arm is mounted for pivotal movement and includes a follower for engaging the movable member to extend the stop arm to its operating position.

9. The apparatus of claim 8 wherein the follower is a roller positioned to engage and end portion of the movable member.

10. A positive pneumatic linear stopping and positioning system comprising:

a pneumatic positioning actuator including a cylinder and a movable piston operatively connected to a worktable for moving the worktable along a rectilinear path, a supporting framework member, a movable selecting member on the framework member that can be indexed to any of a plurality of positions, actuator means connected to the selecting member for indexing the selecting member one or more times to a position adapted to select a particular one of several stop points for the worktable, a movable stop arm that is operatively associated with the selecting member for engaging and stopping the worktable at a stop point determined by the position of the selecting member, the movable selecting member comprises an indexing shaft mounted for rotation on its longitudinal central axis and the actuator is connected to the shaft for indexing the shaft by rotating the shaft to select said stop point, and a pressing sleeve is mounted on the indexing shaft, the shaft is adapted to be shifted along its central longitudinal axis to move the pressing sleeve to a position for extending the stop arm to a position for engaging and stopping the worktable.

11. The apparatus of claim 10 wherein a locking bar is operatively associated between the pressing sleeve and the stop arm for moving the stop arm to an extended operating position when the pressing sleeve is shifted into engagement with the locking bar.

12. A stopping and positioning apparatus for a pneumatic actuator including a cylinder and a movable piston operatively connected to a worktable for moving the worktable along a rectilinear path, said apparatus comprising:

a stop block with an extendible stop arm movably mounted on the block, an indexing shaft mounted for rotational indexing and having a tab member extending therefrom for being moved by rotational indexing of the indexing shaft for selecting a stop point, bearings supporting the shaft for axial shifting movement along its own central axis for moving the tab along a path parallel to the axis of the shaft, and the tab is operatively associated with the stop arm for extending said stop arm to an operating position in the path of the worktable.

13. The apparatus of claim 12 wherein the shaft is a polygonal shaft and the tab is supported on a sleeve with a polygonal opening therein corresponding in shape to the cross-sectional shape of the shaft to prevent rotation of the sleeve on the shaft.

14. The apparatus of claim 13 wherein a locking bar is mounted slidably on the stop block, the stop arm is mounted adjacent the locking bar on the stop block, and the sleeve engages the locking bar for extending the stop arm when the indexing shaft is shifted axially.

15. The apparatus of claim 12 wherein a second indexing shaft is mounted for rotation and axial shifting movement adjacent the positioning actuator, the indexing shafts are connected to one another for synchronous rotation, and at least one stop arm is operatively associated with the second indexing shaft for being placed in an operating position for stopping the worktable at a selected stop point.

16. A positioning apparatus for a machine element comprising:

a supporting framework, at least one stop block assembly secured to the framework adjacent to a positioning actuator, said stop block including an extensible member for stopping the movement of said machine element that is connected to said actuator, a rotatable multi-faceted indexing shaft supported on the framework and located proximate to the stop block, at least one pressing sleeve mounted on the shaft and each such pressing sleeve being operatively associated with one of the stop blocks, an indexer for repeatedly rotating the shaft through a pre-established angle during a succession of indexing steps, an actuator is connected to the shaft for shifting the shaft axially to cause one of the pressing sleeves to engage a selected stop arm, and the extended stop arm is positioned in the path of the machine element for thereby stopping the machine element at a preselected stop point.

17. The apparatus of claim 16 wherein the angle is equal to an arc transected by each face of the shaft with respect to a center of said shaft.

18. The apparatus of claim 16 wherein the indexer comprises a linear actuator connected to the shaft for rotating the shaft through a one-way clutch to repeatedly rotate the shaft through said angle.

19. The apparatus of claim 16 wherein said apparatus is bi-directional and includes a plurality of stop members for positioning and stopping the motion of the machine element when moving in either of two opposed directions.

20. The apparatus of claim 19 wherein the apparatus includes at least one stop member positioned on one side of the apparatus for positioning and stopping the motion of the machine element when traveling in a first direction and a second stop member positioned on a second side of the apparatus for positioning and stopping the movement of the machine element when traveling in a direction opposite of said first direction.

21. The apparatus of claim 16 wherein a plurality of stop members are provided and a control is connected to the stop members for actuating the stop members in a predetermined non-sequential order.

22. The apparatus of claim 16 wherein a plurality of stop members are provided and a control is connected to the stop members for actuating the stop members in an ascending or descending linear sequence.

23. An apparatus for positioning a worktable that is connected to an actuator including a cylinder and a piston for moving the worktable along a rectilinear path, said apparatus comprising:

at least one stop block adapted to be secured at a desired stop point along said path, a movable stop arm mounted on each such stop block for movement between a retracted position and an extended operating position that engages the worktable to halt the movement of the worktable at a selected stop point, an actuator operatively associated with each stop block for moving a stop arm to a selected position, and a retractable lock member operatively associated with the actuator associated with said stop block for holding the stop arm in place by locking the stop arm in its extended position when the lock member is moved to an operating position.

24. The apparatus of claim 23 wherein the actuator associated with said stop block is a cylinder and a piston.

25. The apparatus of claim 23 wherein a spring is operatively associated with the actuator associated with said stop block for returning the actuator associated with said stop block to a selected position.

26. An apparatus for positioning a worktable that is connected to an actuator including a cylinder and a piston for moving the worktable along a rectilinear path, said apparatus comprising:

at least one stop block adapted to be secured at a desired stop point along said path, a shock absorber having a movable bumper is connected to the worktable, a movable stop arm having an operating face located in the path of the worktable when extended to engage the bumper of the shock absorber, said stop arm is mounted on each such stop block for movement between a retracted position and an extended operating position that engages the bumper which gently slows the movement of the worktable until the extended bumper reaches a seated position to halt the movement of the worktable at a selected stop point, and an actuator operatively associated with each stop block for extending a selected stop arm to the extended position in the path of the bumper.

27. The apparatus of claim 26 wherein the actuator associated with said stop block is a cylinder and a piston.

28. The apparatus of claim 26 wherein a spring is operatively associated with the actuator associated with said stop block for returning the actuator associated with said stop block to a selected position.

* * * * *